Dec. 23, 1947. M. ZALICOVITZ 2,433,012
RESILIENT CONSTRUCTIONS FOR USE IN FURNITURE
Filed Nov. 4, 1942 3 Sheets-Sheet 1

INVENTOR.
Morris Zalicovitz
BY
Caesar and Rivise
Attorneys.

Dec. 23, 1947.  M. ZALICOVITZ  2,433,012
RESILIENT CONSTRUCTIONS FOR USE IN FURNITURE
Filed Nov. 4, 1942  3 Sheets-Sheet 2
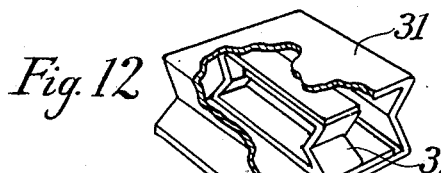
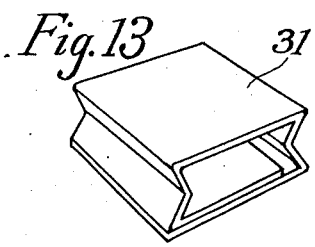
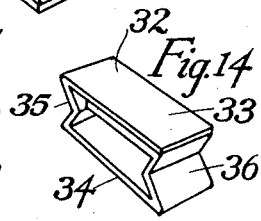
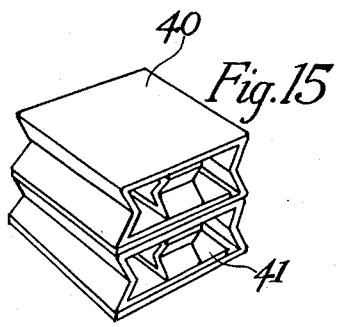
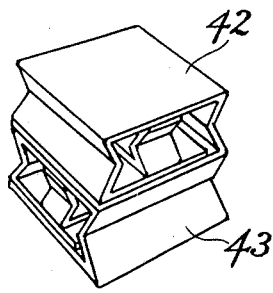
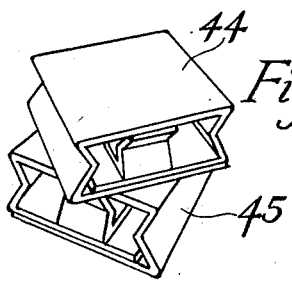
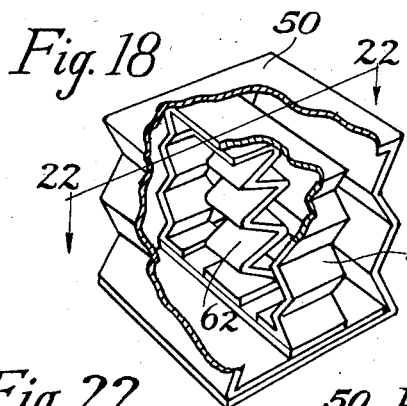
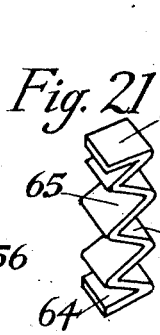
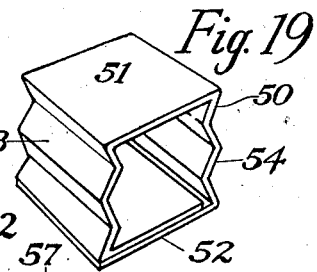
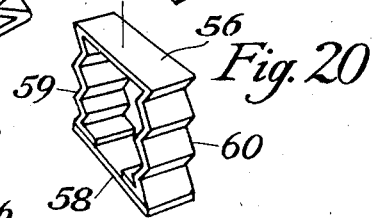
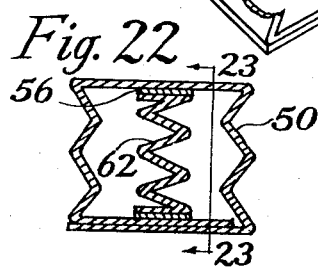
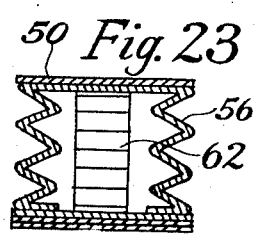
INVENTOR.
Morris Zalicovitz
BY
Caesar and Rivise
Attorneys.

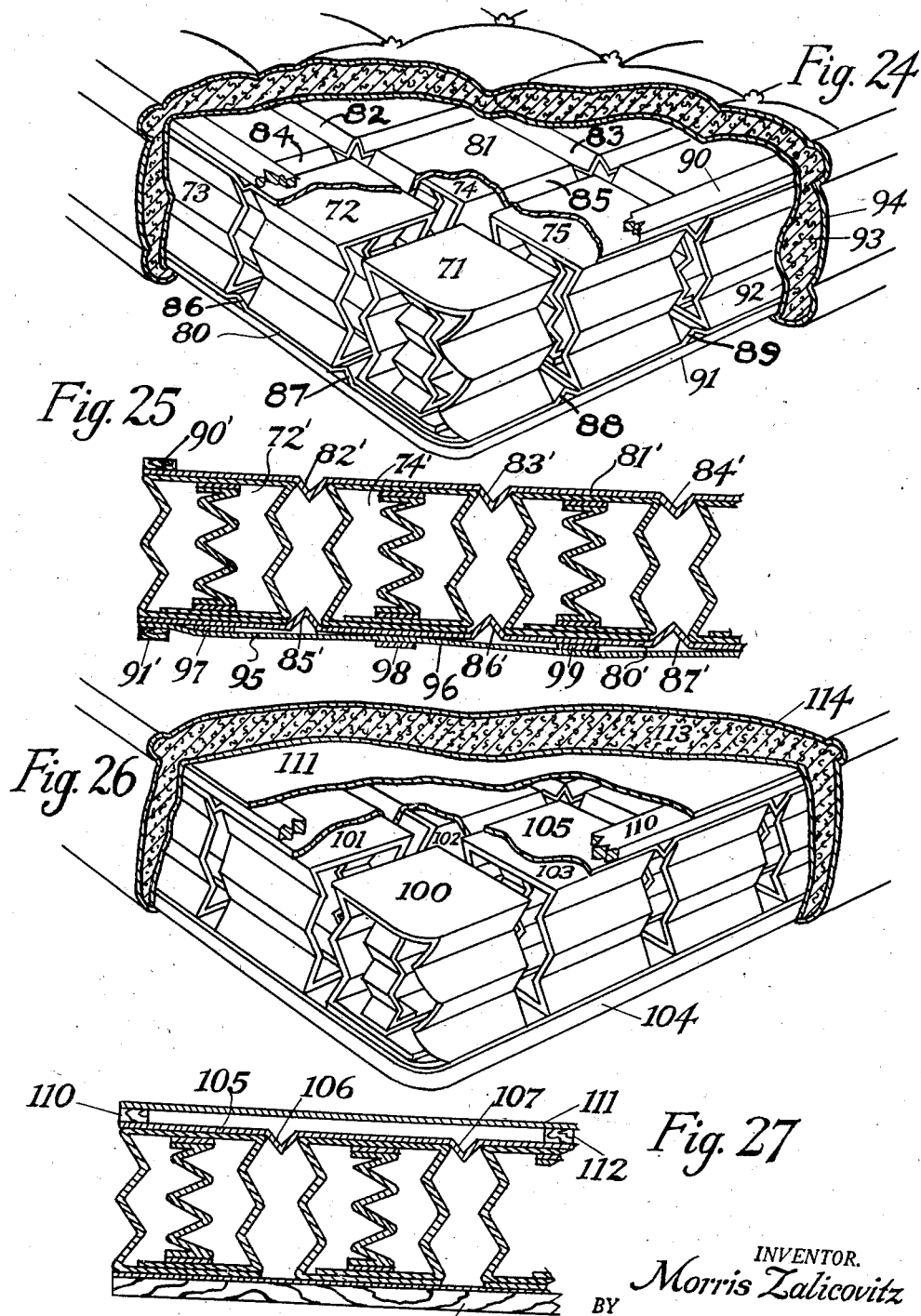

Patented Dec. 23, 1947

2,433,012

UNITED STATES PATENT OFFICE 2,433,012

RESILIENT CONSTRUCTION FOR USE IN FURNITURE

Morris Zalicovitz, Philadelphia, Pa.

Application November 4, 1942, Serial No. 464,440

5 Claims. (Cl. 5—247)

This invention relates to resilient constructions, and has particular reference to resilient constructions especially adapted for use in furniture.

The primary object of the invention is to provide a resilient construction, which entirely eliminates the use of metal and other strategic material.

Another object is to provide a resilient construction of relatively inexpensive, readily available non-strategic materials such as paper, cardboard, or synthetic plastics.

Another object is to provide a resilient construction, which can be produced on a large commercial scale at a relatively small cost.

Another object is to provide a resilient construction, particularly suitable for use in furniture such as cushions, sofas, couches, cots, beds, mattresses, bed springs, etc.

Another object is to provide an article of furniture of light, rugged, resilient construction, which does not contain metallic springs, and which is at least as comfortable as furniture made with springs of the conventional type.

In its very essence, the resilient construction of the invention consists of one or more units in the form of tubes, each constructed out of a flexible, relatively stiff, non-metallic sheet material such as paper, cardboard, or synthetic plastics. These tubes are preferably of relatively short length, and have two opposite substantially flat sides; the connecting sides being provided with creases or lines of fold parallel to the flat sides. For convenience, the creased sides may be referred to as "plaited," "bellowed" or "accordion" sides. By reason of the bellowed sides, the units may be collapsed by the application of pressure to the uncreased sides.

The invention is of general application in its field, and the underlying directing concept is capable of being embodied in a large number of physical forms. For the purpose of this disclosure, several different forms of resilient units will be illustrated and described, and the units will be shown and described as being embodied in two articles of furniture; namely, a mattress and a bedspring. Although the invention will be described with considerable detail and particularity and certain specific language will be utilized, it will be understood that the disclosure is illustrative rather than restrictive, and that the invention is not limited to the embodiments shown. Also that terms such as top, bottom, sides, etc., are used in a relative and not absolute sense.

Brief reference will now be had to the drawings, wherein:

Figure 12 is a perspective view, partly broken away, of another form of resilient unit;

Figure 13 is a perspective view of the outer member of Figure 12;

Figure 14 is a perspective view of the inner member of Figure 12;

Figure 15 is a perspective view of two units such as shown in Figure 12 superposed so as to form a taller unit;

Figure 16 is a perspective view showing a second way of superposing two units of Figure 12;

Figure 17 is a perspective view showing a third way of superposing two units of Figure 12;

Figure 18 is a perspective view, partly broken away, of another form of resilient unit;

Figure 19 is a perspective view of the outer element of Figure 18;

Figure 20 is a perspective view of the intermediate element of Figure 18;

Figure 21 is a perspective view of the inner element of Figure 18;

Figure 22 is a cross-section through Figure 18 on line 22—22;

Figure 23 is a cross-section on line 23—23 of Figure 22;

Figure 24 is a perspective view of one corner of a spring mattress, partly broken away, embodying a plurality of resilient units of the invention;

Figure 25 is a cross-section through a modified form of spring mattress, the padding and covering material being omitted for clearness;

Figure 26 is a perspective view of one corner of a box spring, partly broken away, embodying a plurality of resilient units of the invention; and Figure 27 is a cross-section through the resilient construction of Figure 26, the padding and covering materials being omitted for clearness.

As has been pointed out, the gist of the invention is a resilient unit in the form of a tube of non-metallic sheet material such as paper, cardboard or synthetic plastic, having two opposite plaited, bellowed or accordion sides so that the unit may be collapsed by the application of pressure. The sheet material may advantageously, but not necessarily, be treated as by coating or impregnation with one or more substances to impart desired properties thereto such as resiliency, vermin-proofness, resistance to water and fire, etc. A sheet material, which is not normally stiff or flexible enough for my purpose, may be impregnated with a material such as a resin (natural or synthetic), to render it suitable.

Figure 1:
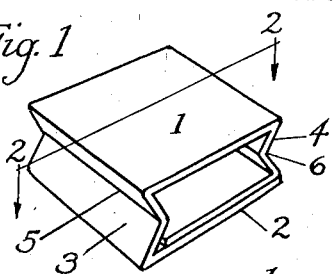
Figure 1 is a perspective view of one embodiment of the resilient unit, which constitutes the essential element of the invention.
Figure 2:
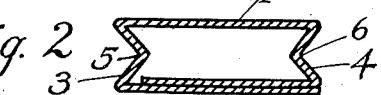
Figure 2 is a cross-section along line 2—2 of Figure 1.

A very simple form of resilient unit is shown in Figures 1 and 2. This unit consists of a single strip of cellulosic material such as kraft board, bent into a relatively short tube of substantially rectangular construction, the end portions of the strip overlapping and being secured together by means of a suitable adhesive, or by stitching or stapling. The unit has the substantially flat top 1, the substantially flat two-layered bottom 2, and the bellowed or accordion sides 3, 4. The bellowed sides may be readily formed by providing the sides with a horizontal crease line or line of fold 5, 6.

Figure 4:
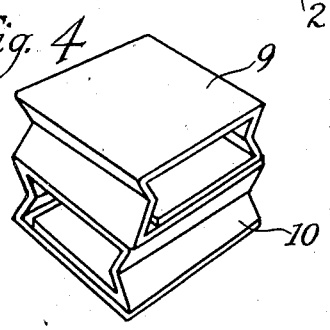
Figure 4 is a perspective view showing a second way of superposing two units of Figure 1.
Figure 5:
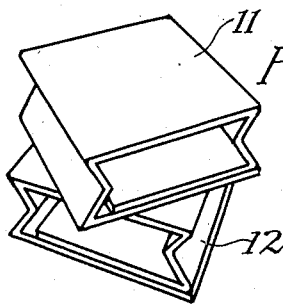
Figure 5 is a prespective view showing a third way of superposing two units of Figure 1.
Figure 3:
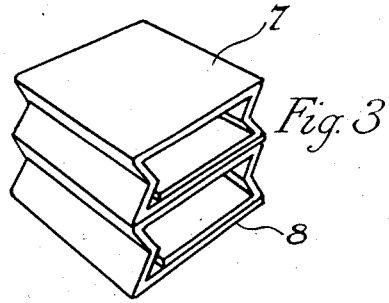
Figure 3 is a perspective view showing two of the units of Figure 1 superposed so as to form a taller unit.

The unit may be made of desired height, but since the sides have but one crease, it may be preferable to stack two or more shallow units to obtain a unit of increased height. Three different ways of superposing two units are shown in Figures 3, 4, and 5. The stacked units may be secured together in suitable manner as by adhesive, stapling or stitching, or by clamping them together. The superposed units exhibit greater resistance to pressure applied to the top, than does a single unit.

Referring to Figure 3, it will be seen that the two units, designated as 7, 8, are superposed lengthwise of each other. In Figure 4, the two units, indicated by 9, 10, are superposed crosswise (right angles) to each other, and in Figure 5, the two units, denoted by 11, 12, are superposed in diagonal relationship. If thought necessary or desirable, the protruding corners may be cut off.

Figure 6:
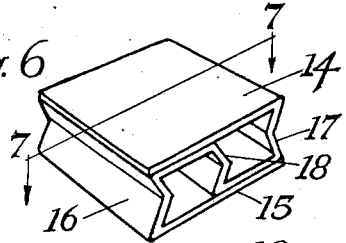
Figure 6 is a perspective view of another form of resilient unit.
Figure 7:
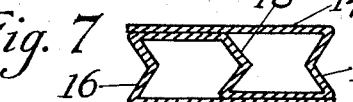
Figure 7 is a cross-section on line 7—7 of Figure 6.

In order to increase the resistance of the unit to pressure applied to the top, the unit may be provided with a central plaited or bellowed partition as shown in Figures 6 and 7. Referring to these figures, it will be seen that the unit is formed out of a single strip of cellulosic material to form the flat top and bottom, 14 and 15 respectively, the plaited or bellowed sides 16, 17, and the central plaited or bellowed partition 18. It is to be noted that due to the manner of the formation, one-half of the top wall and one-half of the bottom wall are in two layers. The two layers may be secured together as by adhesive, stapling or stitching.

Figure 8:
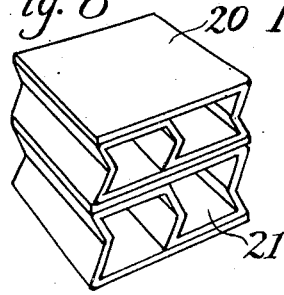
Figure 8 is a perspective view showing two units of Figure 6 superposed to form a taller unit.
Figure 9:
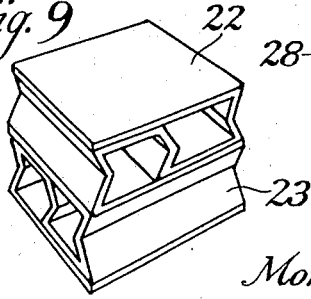
Figure 9 is a perspective view showing another way of superposing two of the units of Figure 8.

Two different ways of superposing several units of Figures 6 and 7 are illustrated in Figures 8 and 9. In Figure 8, two units, 20, 21, are shown disposed one above the other lengthwise, while in Figure 9, two units 22 and 23 are shown superposed cross-wise (right angles) to each other. In either case, the superposed units may be secured together in any suitable manner, as by means of adhesive, stapling, stitching or clamping.

Figure 10:
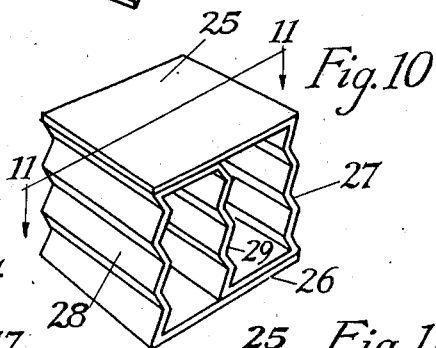
Figure 10 is a perspective view of a resilient unit similar to the unit of Figure 6, but being substantially taller.
Figure 11:
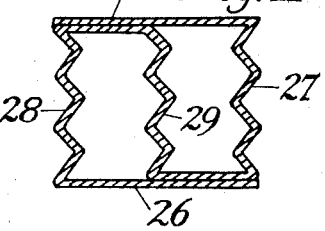
Figure 11 is a cross-section through Figure 10 on line 11—11.

In Figures 10 and 11 is illustrated a unit similar to the one shown in Figures 6 and 7, the unit being of greater height and the side walls and intermediate partition being provided with a greater number of creases or lines of fold (accordion plaits). This unit may be formed out of a single strip of material of sufficient length. The top and bottom are denoted by 25 and 26 respectively, the bellowed sides by 27 and 28, and the central bellowed partition by 29.

In Figures 12, 13 and 14 is shown a form of resilient unit comprising an outer member 31 and an inner member 32. The outer member 31 may be of the same construction as the unit shown in Figure 1, and further description is not necessary. The inner member 32 is a strip of cellulosic material bent into a short rectangular tube having the flat opposite sides 33 and 34 respectively, and the plaited or bellowed sides 35, 36. As shown, the inner member fits into the outer member, the flat sides of the two members being in parallel contacting relationship and their plaited or bellowed sides being at right angles. The members may be left unsecured, or they may be secured together as by stitching, stapling or adhesive.

Figures 15, 16 and 17 show three ways of superposing several units of Figure 12 so as to obtain a unit of greater height. In Figure 15, two units (40, 41) are superposed lengthwise of each other; in Figure 16, two units (42, 43) are positioned cross-wise, or at right angles, and in Figure 17, two units (44, 45) are stacked diagonally. The superposed units may be secured together in any of the ways previously mentioned, or may be left unsecured. The protruding corners in Figure 17 may be cut off.

As has been stated, the resilient units comprising a central bellowed partition in addition to the side walls, and those consisting of several stacked units exhibit greater resistance to vertical pressure than the simpler form shown in Figure 1. In Figures 18 to 23 inclusive is illustrated a form of resilient unit, which exhibits still greater resistance. This form consists of an outer member, an intermediate member and an inner member.

Referring to said figures of the drawing, it will be seen that the outer member 50 is a short rectangular tube having the flat top 51, the flat bottom 52 and the plaited or bellowed sides 53 and 54. The plaited or bellowed sides are shown to have three horizontal creases or lines of fold.

The reference numeral 56 designates the intermediate member, which is also a rectangular tube, but of shorter length, having the flat top and bottom 57, 58 and the bellowed or accordion sides 59 and 60. It is to be noted that the top and sides are formed of one strip of material, and the bottom of another, the two strips being secured together in a suitable manner. It is also to be noted that the intermediate member is made of a longer, though narrower, strip of material than the outer member. The bellowed sides of the intermediate member have five creases or lines of fold, two more than in the sides of the outer member. It will be understood, that the intermediate member has a greater effective lift, when unrestrained, than the outer member.

The inner member is denoted by the numeral 62, and is formed of a strip of cellulosic material bent on itself seven times, providing the two end tabs 63 and 64 and an intermediate plaited or accordion portion 65 having five creases or lines of fold. The plaited portion 65 is substantially the same length as each of the bellowed side walls of the intermediate member 56 and longer than each of the bellowed walls of the outer member. As a result, when the units are assembled in the manner shown in Figure 18, pressure applied to the top will be distributed more uniformly than would otherwise be the case.

Referring to Figure 18, it will be seen that the intermediate element 56 fits into the outer element 50, the flat sides of the two members being in parallel contacting relationship and their plaited or bellowed sides being at right angles. As in the previously described embodiment, the two members may be left unsecured, or they may be secured together as by stitching, stapling or adhesive. The inner member 62 fits within the intermediate member, and may be disposed parallel to the plaited or accordion sides of the outer member. The two tabs 63 and 64 may be secured in any suitable manner to the flat top and bottom of the intermediate member.

The units, which have been described, may be embodied into various articles of furniture such as cushions, sofas, couches, beds, mattresses, etc., which require a resilient foundation or base. The units may also be formed into a resilient construction for use instead of a bed spring. In Figures 24 and 26, the resilient units are shown embodied in a spring mattress and a box spring respectively. In each of these articles of furniture, a plurality of units are positioned in close proximity so as to form a resilient construction of desired dimensions. The resilient construction may be formed of one or more layers of juxtaposed units, the preferable arrangement in the case of units such as shown in Figure 18 being a single layer of closely spaced units.

Reference will now be made to Figure 24, wherein the units are shown embodied in a mattress of the inner spring type. The reference numerals 71, 72, 73, 74, 75, etc., denote a number of units arranged in closely spaced relationship in a single layer on a sheet of fabric such as paper, cloth, etc., denoted by the numeral 80. The units are preferably disposed so that adjacent units have their accordion sides at right angles. A similar fabric 81 covers the units, the units being secured to the two fabric layers as by means of adhesive or stitching. The upper covering fabric may advantageously be provided with indentations as shown at 82, 83, 84, 85, etc., to fit down in between the adjacent units. The lower covering may be provided with similar indentations as shown at 86, 87, 88, 89, etc., to fit in between the adjacent units. The units positioned at each corner of the structure may be rounded at the outer corners as shown in the case of unit 71, so that the resulting article may have rounded corners.

The top and bottom of the juxtaposed units may be provided as shown with the outer rims 90 and 91, which may be of non-metallic material such as cardboard, wood, "Masonite," "Celotex," etc. The assembly may be made into a mattress in substantially the same way as a spring construction is made into a mattress of the conventional type. By way of illustration, it may be stated that the assembly is completely covered with a cloth envelope, denoted by 92, a layer of padding 93 of suitable thickness is applied, and an outer covering 94 of cloth is finally applied. If thought necessary or desirable, the final structure may be ornamented or embellished to increase its sales appeal.

A permissible variation over the structure shown in Figure 24 is shown in Figure 25. In the embodiment of Figure 25, the outer rim 90 on top of the resilient unit or the outer rim 91 on the bottom of the resilient unit or both of said rims may be replaced by a frame of basket-weave construction.

Referring to this figure, the resilient units are denoted by $72^1$, $74^1$, etc., the bottom covering is denoted by $80^1$, the top covering by $81^1$. The top covering is shown provided with the indentations $82^1$, $83^1$, $84^1$, etc., and the bottom covering is shown provided with the indentations $85^1$, $86^1$, $87^1$. It will be understood that other indentations running at right angles to those shown are also provided, all of said indentations fitting into the spaces between the units.

The top of the assembly is shown provided with an outer rim $90^1$, while the bottom is shown provided with a basket-weave frame 95. This frame consists of an outer rim $91^1$ and a number of transverse slats (one of which is indicated by 96), and a number of longitudinal slats 97, 98 and 99. The number of longitudinal slats is equal to the number of resilient units arranged transversely, and the number of transverse slats is equal to the number of resilient units arranged longitudinally. Furthermore, the longitudinal slats cross the transverse slats at the center of the resilient units. Hence, pressure applied to the frame will be transmitted to the central axis of each unit in the assembly.

In Figure 26 is shown an assembly similar to that of Figure 24 embodied in a bed spring of the so-called box type. The juxtaposed units, which are indicated by 100, 101, 102, 103, etc., are mounted on a base board 104 of non-strategic material such as wood. The top of the assembly may be covered by a cloth layer 105 having folds 106, 107, etc., extending down in between the units. A peripheral rim 110 of cardboard, "Masonite," "Celotex," etc., may be positioned on top of the cloth layer and a layer 111 of similar material may be placed on the rim. One or more additional boards or slats 112 may be placed between the assembly of units and the layer 111 for added support. A layer of padding 113, as is conventional in box springs, may be applied to the top and sides of the assembly, and the whole is covered with a cloth envelope 114.

Articles of furniture made in the foregoing manner are rugged in structure, attractive in appearance, and at least as comfortable as furniture having conventional springs. They have the advantage that they are made entirely of non-strategic, readily obtainable, inexpensive materials, and are of relatively light weight.

It is to be noted that when the units of the invention are embodied in articles of furniture, they have increased resistance to pressure due to the entrapment of air. This greatly increases the cushioning effect of the article of furniture.

I claim:

1. A resilient unit comprising a tube of flexible, relatively stiff cellulosic sheet material having two opposite substantially flat sides and two connecting sides, said connecting sides being formed with one or more lines of fold parallel to said substantially flat sides, said unit being collapsible by the application of pressure parallel to said connecting sides, and resilient means interposed between said substantially flat opposite sides to resist collapse of said unit by the application of pressure, said means consisting of a second tube having two opposite substantially flat sides and two connecting sides formed with one or more lines of fold.

2. A resilient structure consisting of a top layer and a bottom layer in spaced relation, and a plurality of units disposed between said layers side by side both longitudinally and transversely of said layers, each of said units comprising a tube of flexible, relatively stiff non-metallic sheet material having two opposite substantially flat sides and two connecting sides, said connecting sides being formed with one or more lines of fold parallel to said substantially flat sides, all of said units being disposed with their connecting sides substantially at right angles to the top and bottom layers, and means connecting said units to said top and bottom layers.

3. A resilient structure consisting of a top layer and a bottom layer in spaced relation, and a plurality of units disposed between said layers side by side both longitudinally and transversely of said layers, each of said units comprising a tube of flexible, relatively stiff cellulosic sheet material having two opposite substantially flat sides and two connecting sides, said connecting sides being formed with one or more lines of fold parallel to said substantially flat sides, all of said units being disposed with their connecting sides substantially at right angles to the top and bottom layers, and means connecting said units to said top and bottom layers.

4. An article of furniture having a resilient foundation, said foundation comprising a plurality of resilient units disposed side by side both longitudinally and transversely of said article, each of said units comprising a tube of flexible, relatively stiff cellulosic sheet material having two opposite substantially flat sides and two connecting sides, said connecting sides being formed with one or more lines of fold parallel to said substantially flat sides, all of said units being disposed with their connecting sides substantially at right angles to the top and bottom of said article, and means connecting said resilient units together.

5. An article of furniture having a resilient foundation, said foundation comprising a plurality of resilient units disposed side by side both longitudinally and transversely of said article, each of said units comprising a tube of flexible, relatively stiff cellulosic sheet material having two opposite substantially flat sides and two connecting sides, said connecting sides being formed with one or more lines of fold parallel to said substantially flat sides, all of said units being disposed with their connecting sides substantially at right angles to the top and bottom of said article, means within each unit to resist collapse by pressure, and means connecting said resilient units together.

MORRIS ZALICOVITZ.

REFERENCES CITED

The following references are of record in the file of this patent:

UNITED STATES PATENTS

| Number | Name | Date |
| --- | --- | --- |
| 1,627,835 | Combs | May 10, 1927 |
| 1,917,970 | Hayes | July 11, 1933 |
| 580,284 | Krieg | Apr. 6, 1897 |
| 585,834 | Ruth | July 6, 1897 |
| 591,022 | Steiner | Oct. 5, 1897 |
| 133,102 | Hollings | Nov. 19, 1872 |
| 771,809 | Burnell | Oct. 11, 1904 |
| 336,774 | Wells | Feb. 23, 1886 |
| 18,630 | Colton | Nov. 17, 1857 |

FOREIGN PATENTS

| Number | Country | Date |
| --- | --- | --- |
| 253,768 | Great Britain | June 24, 1926 |
| 180,406 | France | Dec. 21, 1886 |
| 389,833 | Great Britain | Mar. 20, 1933 |
| 333,265 | Great Britain | Aug. 8, 1930 |
| 476,659 | Great Britain | Mar. 6, 1936 |

OTHER REFERENCES

Ser. No. 383,860, Sluyter, (A. P. C.) pub. May 11, 1943.